M. Pierce,
Bed Bottom,
N°70,355. Patented Oct.29, 1867.
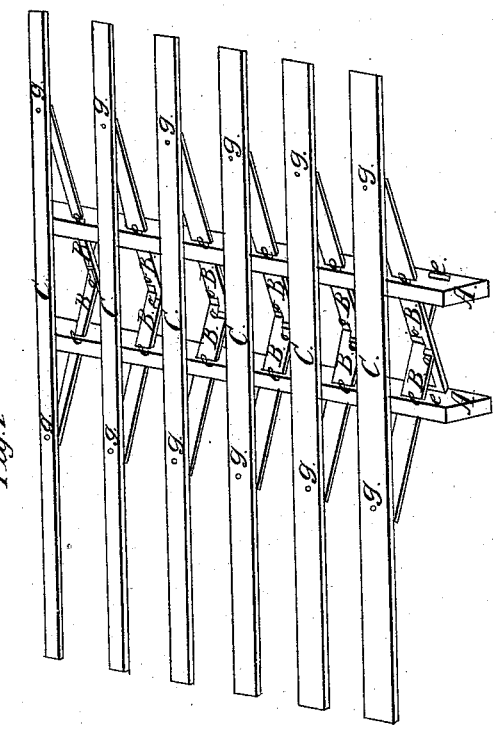
Fig. 1
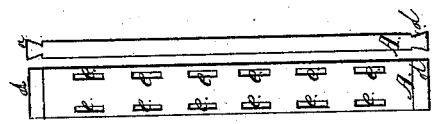
Fig. 2
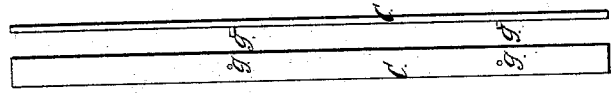
Witnesses:
C. G. Maybury
Geo Poster
Inventor,
Marvin Pierce

United States Patent Office.

MARVIN PIERCE, OF WINONA, MINNESOTA.

Letters Patent No. 70,355, dated October 29, 1867.

IMPROVED SPRING-BED BOTTOM.

*The Schedule referred to in these Letters Patent and making part of the same.*

TO ALL WHOM IT MAY CONCERN:

Be it known that I, MARVIN PIERCE, of Winona, in the county of Winona, and State of Minnesota, have invented certain new and useful Improvements in Spring-Bed Bottoms; and I do hereby declare that the following is a full, clear, and exact description thereof, reference being had to the annexed drawings, and letters of reference marked thereon, making a part of this specification.

In the accompanying drawings, C C C C represent a series of slats, running lengthwise with and of a length to suit the interior of the bedstead. These slats are supported upon springs, constructed substantially as follows: Near the centre of the slats, two horizontal bars A A, are placed a suitable distance apart, and run crosswise of the bedstead, and at right angles with the slats C. Each of these bars A is provided with two rows of angular openings e e, through which are passed the springs B, which support the slats C. B B B B represent the springs, which are usually of wood, and formed of narrow strips having a portion of one end taken off, and dove-tailed in the manner as seen in Figure 2. Each slat C rests upon the outer ends of two of these springs B, which said springs pass obliquely through the angular openings e in bars A, and are locked by means of their dove-tails in the centre between the bars A, so that their outer ends project upwards and above the upper faces of bars A, as shown. Each slat is provided with a pin, g, which catches into a small opening at the outer end of the spring B.

A bed-bottom thus formed will be found elastic and durable, and, being of an economical form, can be readily repaired should one of its parts become broken.

What I claim, and desire to secure by Letters Patent, is—

The slats C C running lengthwise of the bed, and resting upon the extremities of two springs B B, formed as herein described, and connected through angular openings e e in two bars A A, which extend crosswise of the bed, when constructed, arranged, and used in the manner and for the purposes set forth.

MARVIN PIERCE.

Witnesses:
   JACOB STORY,
   E. ELY.